United States Patent [19]

Chan et al.

[11] Patent Number: 5,127,563
[45] Date of Patent: Jul. 7, 1992

[54] MOUNTING DEVICE FOR BICYCLE ACCESSORIES

[75] Inventors: Don H. W. Chan, Taunton, Mass.; Tod Patterson, Westport; Timothy J. Fenton, New Canaan, both of Conn.

[73] Assignee: Cannondale Corporation, Georgetown, Conn.

[21] Appl. No.: 637,174

[22] Filed: Jan. 3, 1991

Related U.S. Application Data

[63] Continuation-in-part of Ser. No. 406,430, Sep. 12, 1989, abandoned.

[51] Int. Cl.⁵ .......................... B62J 9/00; B62J 11/00
[52] U.S. Cl. .................................. 224/39; 224/30 R; 224/32 R; 24/590
[58] Field of Search ................ 224/32 R, 32 A, 30 R, 224/39, 33 R; 24/590, 591

[56] References Cited

U.S. PATENT DOCUMENTS

| 585,108 | 6/1897 | Lamson | 224/39 |
| 1,124,924 | 1/1915 | Leonard | 224/32 R |
| 4,566,617 | 1/1986 | Jackson | 224/39 |
| 4,643,343 | 2/1987 | Goldman et al. | 224/39 |

FOREIGN PATENT DOCUMENTS

| 2421789 | 12/1979 | France | 224/32 A |
| 2144 | of 1914 | United Kingdom | 224/39 |
| 516942 | 1/1940 | United Kingdom | 224/39 |
| 646120 | 11/1950 | United Kingdom | 224/32 R |

Primary Examiner—Linda J. Sholl
Attorney, Agent, or Firm—Brumbaugh, Graves, Donohue & Raymond

[57] ABSTRACT

A device for removably attaching an accessory to first and second spaced-apart elements affixed to a bicycle and defining an opening that has a minor dimension and a major dimension comprises a support member and a cleat member, which are essentially permanently attached to each other and each of which has a medial portion adapted to span the minor dimension of the opening and a leg portion extending out from each of the opposite ends of the medial portion for engagement with opposite sides of a respective one of said elements. The overall dimension between the outer ends of the leg portions of the cleat member is less than the major dimension of the opening so that the clear member can be inserted in the opening by aligning it with the major dimension of the opening and then repositioned to align it with the minor dimension and engage the leg portions with the bicycle elements. Components are included for fastening the cleat member to the support member, fastening the accessory to the support member, and releasably connecting the support member to a third element affixed to the bicycle to prevent the cleat member and support member from rotating or translating relative to the first and second elements.

12 Claims, 4 Drawing Sheets

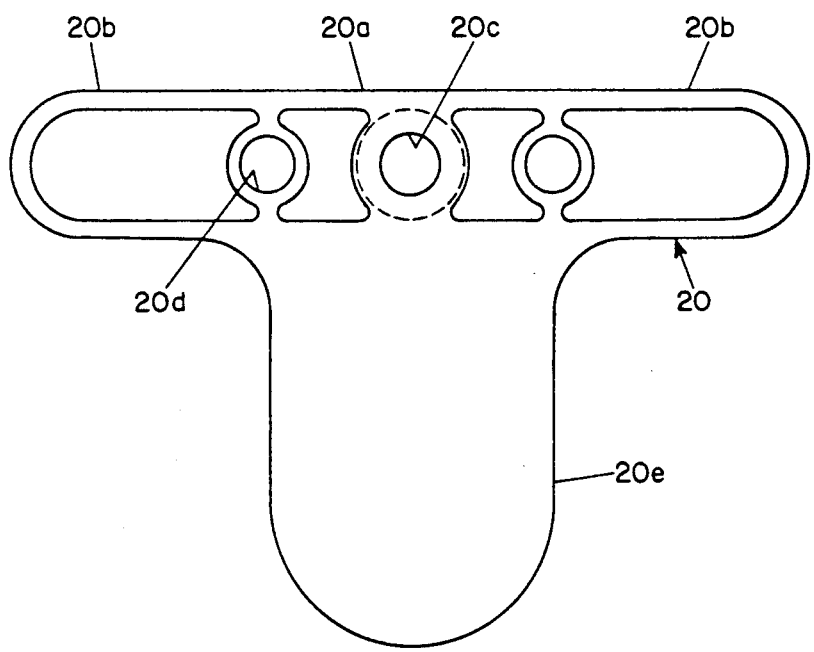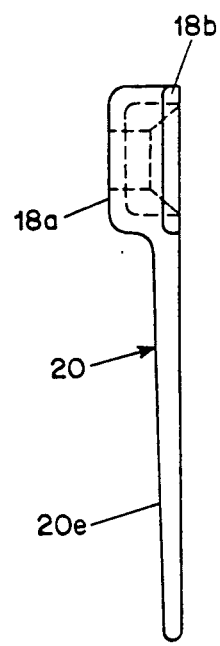
FIG. 4  FIG. 5
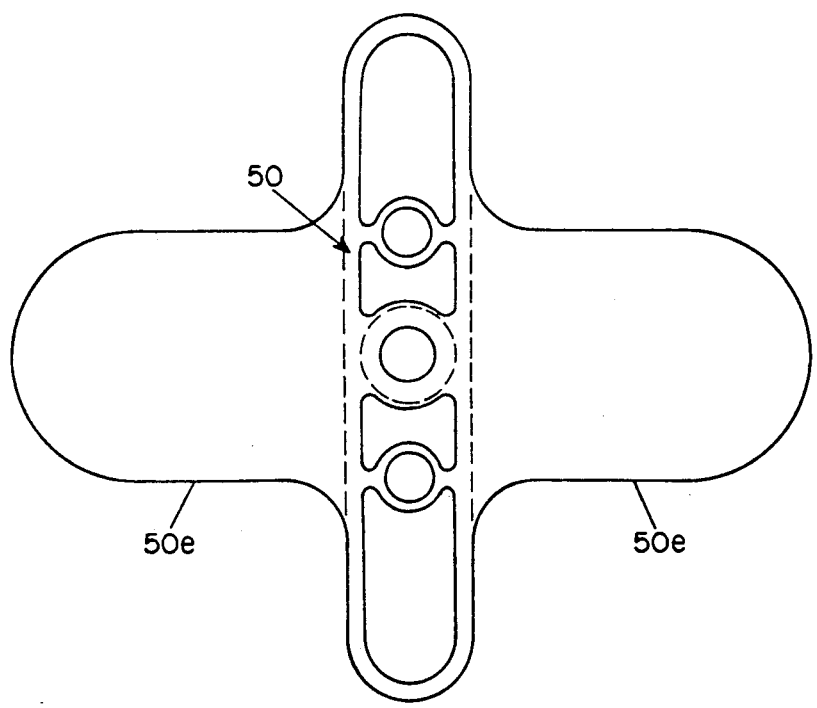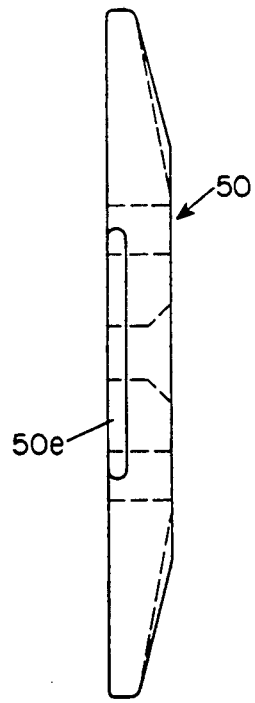
FIG. 17  FIG. 18

MOUNTING DEVICE FOR BICYCLE ACCESSORIES

This is a continuation-in part of U.S. patent application Ser. No. 07/406,430 filed Sep. 12, 1989, now abandoned.

FIELD OF THE INVENTION

The present invention is a device for mounting an accessory on a bicycle.

BACKGROUND OF THE INVENTION

A wide variety of accessories are used by bicyclists to carry things they want to have with them during their rides. For example, bicyclists who ride long distances for recreation, touring, or racing carry one or more water bottles. Nearly all bicyclists equip their bikes with a saddle bag for carrying small articles, such as a wallet, money, keys, tools, a spare tire inner tube, an extra water bottle and food. For recreational bicycling and touring there are carrier bags that fit on the top of front or rear carrier racks.

Nearly all carrier bags for bicycle saddles that are currently on the market are attached by two hook and loop cloth (Velcro ®) straps that are wrapped around the two frame bars of the saddle and a third hook and loop cloth strap that is wrapped around the saddle post. Similarly, hook and loop cloth straps wrapped around the side rails of the platforms of carrier racks constitute the most common way of attaching carrier bags on the tops of rack platforms. These widely used hook and loop cloth attachment systems, though quite satisfactory, are a little tedious to use. The user has to form each loop around the frame bar or side rail and press it home. With saddle bags the user must hold the bag with one hand and complete the two side loop attachments with the other hand in a relatively small space up under the saddle. Also, the tenacity of the hook and loop cloth diminishes as the material wears with normal use.

SUMMARY OF THE INVENTION

An object of the present invention is to provide a device for attaching various bicycle accessories to the bicycle in a manner that is very simple to use, provides a very secure attachment and is highly durable. The device makes use of two spaced-apart elements that are affixed to the bicycle and define an opening between them. Such elements include the frame bars of saddles and the platform rails of carrier racks.

The present invention is a device for removably attaching an accessory to first and second spaced-apart elements affixed to a bicycle, the elements defining an opening between them that has a minor dimension and a major dimension and the portions of the elements defining the opening having substantially uniform thickness dimensions orthogonal to the opening. The device comprises a support member and a cleat member joined to each other essentially permanently, the support member and the cleat member each having a medial portion adapted to span the minor dimension of the opening and a leg portion extending out from each of the opposite ends of the medial portion for engagement with opposite sides of a respective one of said elements. The overall dimension between the outer ends of the leg portions of the cleat member is less than the major dimension of the opening, and the spacing between the respective leg portions of the cleat member and the support member is not substantially less than the thickness dimensions of said elements at all points outward of the minor dimension so that the cleat member can be inserted in the opening by aligning it with the major dimension of the opening and then repositioned to align it with the minor dimension and engage the leg portions with said elements. The device further includes components for essentially permanently fastening the accessory to the support member and for releasably connecting the support member to a third element affixed to the bicycle to prevent the cleat member and support member from rotating or translating relative to the first and second elements.

In preferred forms of the invention, the elements defining the opening have opposite sides forming a plane, and the surfaces of the leg portions of the support member that engage the elements are also planar, whereby rotation of the cleat member and support member can occur without cocking or strain. Each leg portion of the cleat member may have a camming surface adapted to engage a respective element upon rotation from alignment with the major dimension to alignment with the minor dimension and to guide the leg portions of the cleat member and the support member into clamping engagements with the elements upon such rotation.

The fastening means preferably comprises at least one screw passing through a hole in the support member and threaded into the cleat member and at least one locating pin on the cleat member extending into a hole in the support member to prevent rotation of the cleat member relative to the support member.

When a device according to the invention is used to attach a carrier bag to the bicycle, a wall of the bag may be engaged between the cleat member and the support member. Alternatively, the support member may be attached to the outside of the bag, and a second support member is received within the bag and is essentially permanently attached to the support member.

According to another aspect of the invention, the component for fastening the support member to the third element is a clip joined to the support member, or to the component to which the carrier member is attached, and having resilient legs portions engageable with opposite sides of the third element. In one embodiment of the device, as used with a carrier bag, the clip includes a base portion engaging the exterior of a portion of a wall of the bag, and the clip is fastened to the bag by means including a backup member engaging the interior of said portion of the bag wall and at least one screw extending through a hole in the backup member and through the bag wall portion into the clip.

For a better understanding of the invention, reference may be made to the following description of exemplary embodiments, taken in conjunction with the accompanying drawings.

DESCRIPTION OF THE DRAWINGS

FIG. 4 is a bottom plan view of a support member;

FIG. 5 is a side elevational view of the support member;

FIG. 17 is a top plan view of the inner support member of the second embodiment; and FIG. 18 is a side elevational view of the inner support member.

DESCRIPTION OF THE EMBODIMENTS

Figure 1:
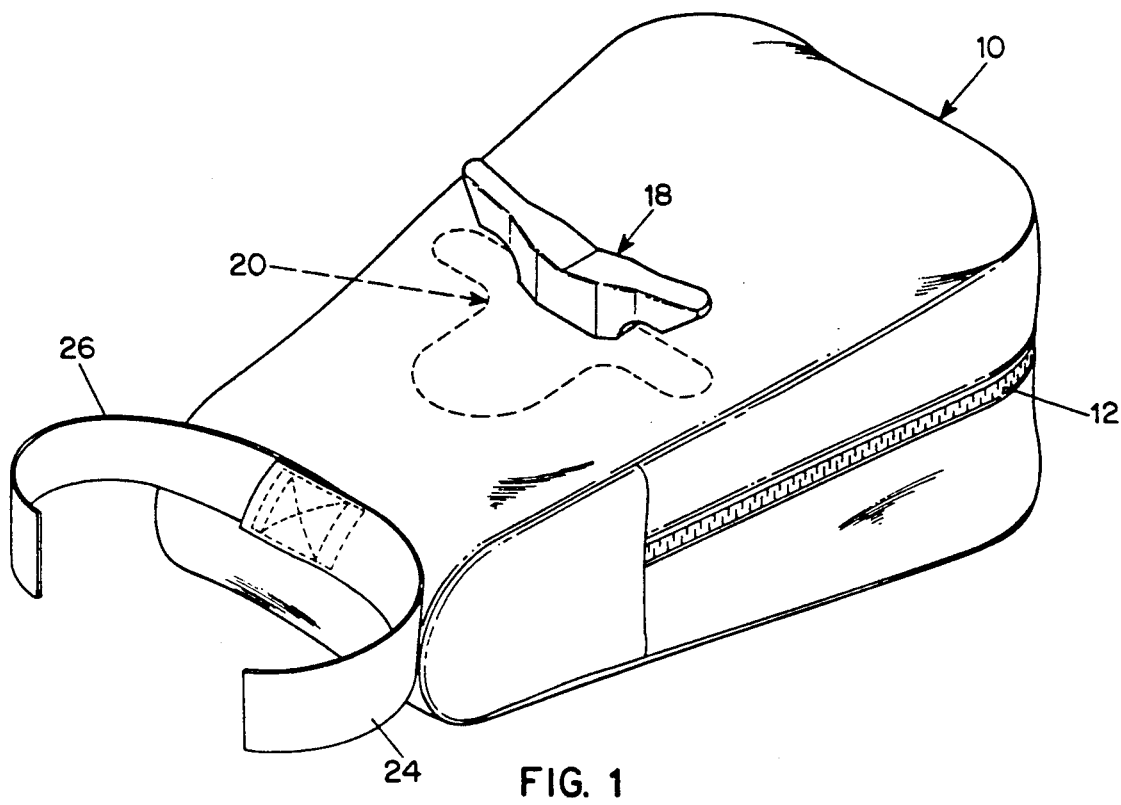
FIG. 1 is a front three-quarter pictorial view of one embodiment.
Figure 2:
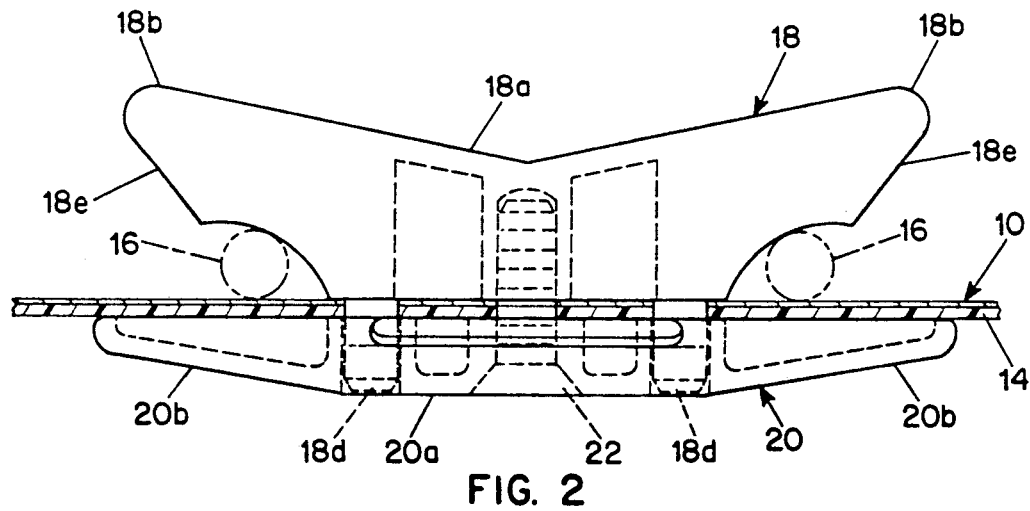
FIG. 2 is a front elevational view of the embodiment of FIG. 1.
Figure 3:
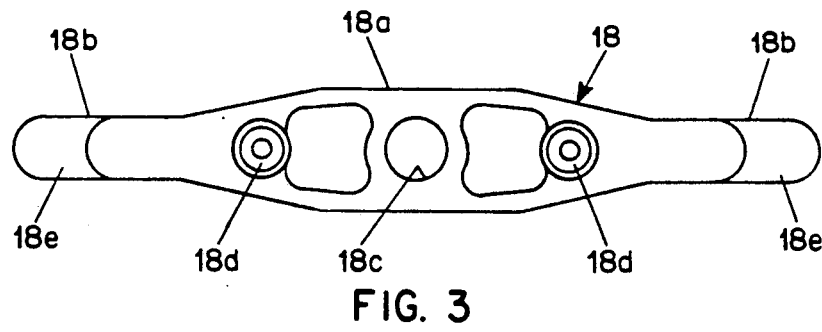
FIG. 3 is a bottom plan view of a cleat member.
Figure 6:
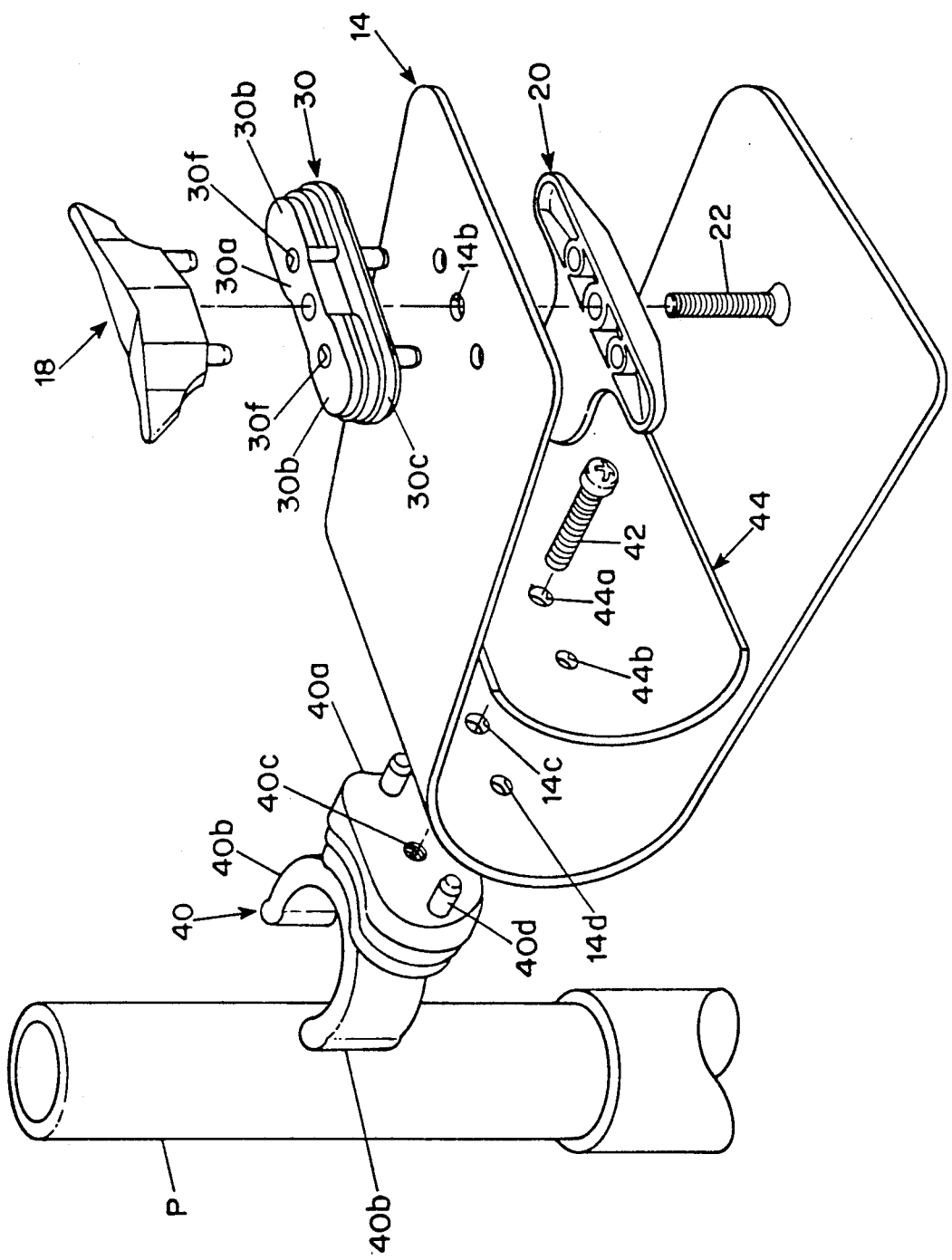
FIG. 6 is an exploded pictorial view of another embodiment of the present invention.
Figure 7:
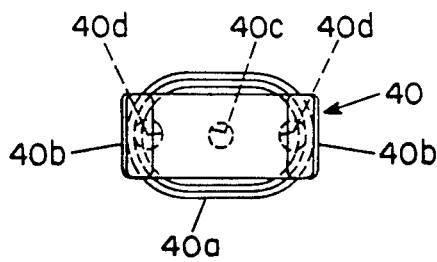
FIG. 7 is a front elevational view of a clip used in the second embodiment.
Figure 9:
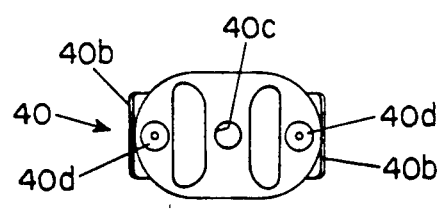
FIG. 9 is a rear plan view of the clip.
Figure 8:
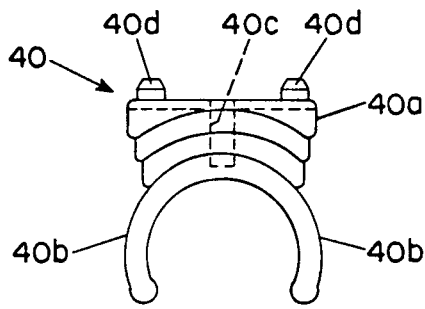
FIG. 8 is a top plan view of the clip.
Figure 10:
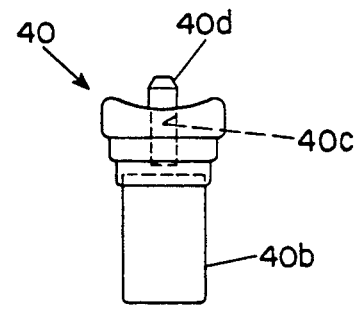
FIG. 10 is a side elevational view of the clip.
Figure 11:
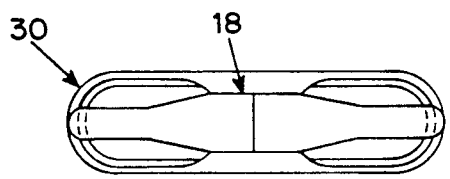
FIG. 11 is a top plan view of the outer support member and cleat member of the second embodiment.
Figure 14:
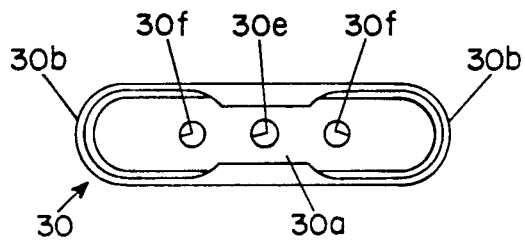
FIG. 14 is a top plan view of the outer support member.
Figure 12:
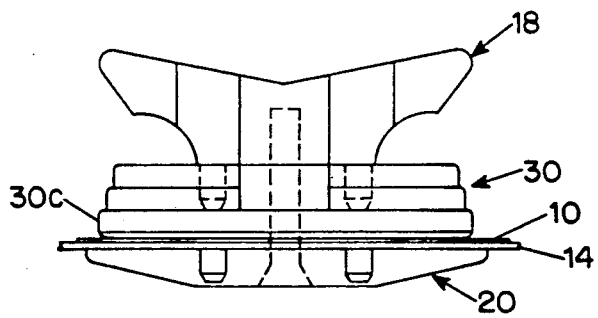
FIG. 12 is a rear elevational view of the cleat member and the inner and outer support members of the second embodiment.
Figure 15:
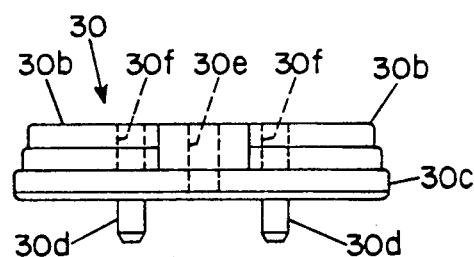
FIG. 15 is a rear elevational view of the outer support member.
Figure 13:
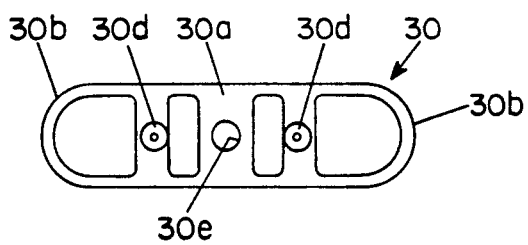
FIG. 13 is a bottom plan view of the outer support member of the second embodiment.
Figure 16:
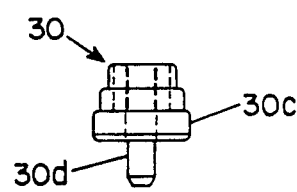
FIG. 16 is a side elevational view of the outer support member.

In both embodiments shown in the drawings the mounting devices is integrated into a bicycle saddle bag 10, which is known per se. The bag 10 is made of a durable fabric and is of a generally wedge shape. A zipper 12 extends partway along each side and across the back. The bag is shaped by a moderately stiff liner 14 (FIG. 2) of a plastic foam sheet that is bent into a "U" and extends continuously along the bottom, front and top walls within the bag and is shaped in plan to conform to the borders of those walls.

The bag 10 is attached to the two parallel metal side frame bars 16 (FIG. 2) of a bicycle saddle by the device of the present invention, which includes a cleat member 18 and a support member 20. The frame bars 16 are of uniform diameter and are spaced apart laterally from each other by a dimension ("minor dimension") that is less than the spacing along a line oblique to the lateral dimension ("major dimension"). Putting it another way, the saddle frame bars 16 define an opening between them having a minor dimension and a major dimension that is substantially larger than the minor dimension and lies oblique to the minor dimension, that is, extends diagonally at a selected angle. The cleat member 18 and support member each have a medial portion 18a, 20a that spans the minor dimension of the opening and a leg portion 18b, 20b that extends out from each of the opposite ends of the medial portion for engagement with opposite sides (in this case, the top and bottom sides) of the saddle frame bars 16. The overall dimension between the outer ends of the leg portions 18b of the cleat member 18 is less than the major dimension of the opening formed by the frame bars 16 so that the cleat member 18 can be inserted between the frame bars from below and at an angle to its installed position and then rotated to align it with the minor dimension and engage the leg portions 18b, 20b with the seat frame bars 16. The medial portion 18a of the cleat member protrudes down between the frame bars, abuts the medial portion 20a of the support member and spans the space between the frame bars in the installed position (FIG. 2), thereby to keep the assembly (cleat, support and bag) from sliding from side to side and to define outwardly open slots in which the frame bars 16 are captured. The spacing between the respective leg portions of the cleat member and the support member at all points outwardly of the minor dimension between the bars 16 is not substantially less than the thickness of the bars, so that the mounting device can be rotated with the bag into and out of the installed position.

The cleat member 18 and support member 20 are fastened together and to the bag 10 by a screw 22 that passes through a hole 20c in the support member 20 and threads into a hole 18c in the cleat member 18 and by pins 18d that project from the cleat member into holes 20d in the support member, which, of course, keep the bag 10, cleat member 18 and support member 20 from rotating relative to each other.

The cleat member and support member are preferably molded from a rigid polymeric material. To save material and keep the weight low, the surfaces that face each other and the interior of the bag have recesses (see FIGS. 2 to 5). The support member has a plate portion 20e that stabilizes the connection of the bag 20 to the cleat member and support member against rocking in the front-to-rear direction.

To facilitate installing the bag on the saddle frame bars, each leg portion 18b of the cleat member 18 has a cam surface 18e that diverges obliquely away from the bag wall and from the longitudinal axis of the bag. If the user does not begin installation by pushing the bag up against the frame bars 16, the rotation of the bag (and the attachment device) will bring the cam surfaces 18e into engagement with the bars, and the cam surfaces will draw the bag up against the bars and help guide the bars into the receiving spaces between the leg portions 18b, 20b of the cleat member and support member.

In the embodiment of FIGS. 1 to 5, the attachment device further includes a hook cloth strap 24 and a loop cloth strap 26 stitched to the front end of the bag. These straps are taken along either side of the saddle post and joined in front of the post. The straps keep the bag from rotating or sliding rearwardly relative to the saddle frame. The front end of the bag engages the seat post, so it can not slide forwardly.

FIGS. 5 to 16 show a second embodiment of the present invention, in which the accessory is also a saddle bag. The bag itself is not shown in the figures but is the same as the bag 10 shown in FIG. 1 and like the bag of FIG. 1 has a relatively stiff, but resilient liner 14. The mounting device includes the same cleat member 18 and the same support member 20 as the first embodiment. To make the device suitable for certain designs of bicycle saddles, in which the embodiment of FIGS. 1 to 5 does not provide enough standoff between the cleat member and the top of the bag to allow the bag to be attached to the frame bars, a second, outer support member 30 is installed in sandwiched relation between the outer surface of the bag wall and the cleat member 18, thereby to increase the standoff. The outer support member has a medial portion 30a and a pair of leg portions 30b that extend out from either end of the medial portion and define with the leg portions 18b of the cleat member 18 laterally open recesses, each having a spacing not substantially less than the diameter of the frame bars 16, for receiving snugly the respective seat bars in a manner substantially the same as that shown in FIG. 2. A base portion 30c of the outer support member 30 has a lower perimeter that substantially matches the upper perimeter of the medial portion and leg portions of the lower support member 20. Pins 30d project down from the bottom of the base portion 30c, pass through holes 14a in the liner 14, and are received in the holes 20d in the inner support member 20. A screw 32 is received through the hole 20c in the inner support member, a hole 14b in the liner and a hole 30e in the outer support member 30 and threads into the hole 18c in the cleat member 18. Holes 30f in the outer support member receive the pins 18d of the cleat member, thereby preventing rotation of the cleat member relative to the outer support member.

Instead of attaching the front of the bag to the seat post by means of hook and loop cloth straps 24 and 26, the embodiment of FIGS. 6 to 16 includes a clip 40, which has a base portion 40a by which it is joined to the bag and a pair of resilient hook-like arm portions 40b that extend from the base portion and resiliently engage the opposite sides of the seat post P. The clip 40 is attached to the bag by a screw 42 that passes from the inside of the bag through a hole 44a in a reinforcing plate 44 and a hole 14c in the liner 14 and threads into a hole 40c in the clip. The clip is prevented from rotating about the screw by pins 40d that are received through holes 14d in the liner 14 and holes 44b in the reinforcing plate 44. The clip may be injection-molded from a rigid, moderately resilient material. The plate 44 can be thermo-formed from a blank of a substantially rigid polymeric sheet material.

The seat bag of FIGS. 6 to 16 can easily be attached to and removed from the bicycle saddle with one hand, leaving the other hand free. The user positions the bag at an angle to the saddle under the seat, pushes it up so that the cleat member 18 passes between the frame bars 16 and then rotates the bag into alignment with the seat. He or she then pushes the bag forward to engage the clip 40 with the sides of the seat port P. A moderate force causes the leg portions 40b of the clip to bend outwardly with respect to each other so as to be received by the post, whereupon they resile into engagement with the seat post. When the clip engages the seat post, the bag is prevented from rotating and from sliding rearwardly. The cleat member supports it vertically and laterally. To remove the bag, the process is reversed—the user pulls the bag rearwardly to release the clip 40 from the seat post, rotates the bag, and moves the bag down to free the cleat member from the saddle frame bars. The bag can be dismounted from the saddle using only one hand.

FIGS. 17 and 18 show a modified support member 50 for use in place of the support member 20. The support member 50 is identical in all respects to the support member 20, except that it has a two plate portions 50e instead of one. The additional plate portion enhances the ability of the support member to support the weight of the bag and its contents.

The invention has been described above and shown in the drawings as applied to a saddle bag accessory. The invention is also applicable to carrier bags that rest on top of the platform of front and rear carrier racks. The cleat members can extend down from the undersides of the bags and engage spaced-apart elements of the platform, such as the side rails. A strap, latch or clip can provide the third attachment point against rotation and longitudinal displacement. Another application of the present invention is in a water bottle holder for attachment under the saddle. The support member can be attached to or form part of a cage for a spare water bottle. The invention is also useful in special brackets and holders for tools, spare tire tubes, or other articles, again by designing the support member appropriately for the special use. In water bottle holders and other special holders, the cleat member and support member can be molded in one piece.

A common characteristic of the uses of the invention is that the elements of the bicycle forming the opening that receives the cleat member have surfaces that are engaged in the slots formed by the leg portions of the cleat member and support member that are substantially planar, so that the attachment device can be inserted into the opening in one orientation and rotated in a plane to the attached position. Also, if the accessory is not stably supported by such elements, the leg portions of the support member may be made wide enough to impart stability by forming stabilizing plate-like portions. The third attachment point of the device may be associated directly with the support member, such as a strap latch or clip affixed to a plate-like part of the support member spaced apart from the leg portions, or indirectly as part of the accessory being attached to the bicycle, as in the case of the straps 24 and 26 in the embodiment, or as a strap or latch attached to the bicycle.

The specification and some of the appended claims refer to an essentially permanent attachment of the support member and cleat member to an accessory. This language is intended to refer to a form of attachment that is not ordinarily undone in the normal use of the mounting device and the accessory; for example, a screw used to attach the cleat member and support member to the accessory is not ordinarily undone, except when replacement of a component of the mounting device may be required.

We claim:

1. A device for removably attaching an accessory to first and second spaced-apart elements affixed to a bicycle, the elements defining an opening between them that has a minor dimension and a major dimension and the portions of the elements defining the opening having substantially uniform thickness dimensions orthogonal to the opening, comprising a support member and a cleat member joined to each other essentially permanently, the support member and the cleat member each having a medial portion adapted to span the minor dimension of the opening and a leg portion extending out from each of the opposite ends of the medial portion for engagement with opposite sides of a respective one of said elements, the overall dimension between the outer ends of the leg portions of the cleat member being less than the major dimension of the opening, the spacing between the respective leg portions of the cleat member and the support member being not substantially less than the thickness dimensions of said elements at all points outward of the minor dimension so that the cleat member can be inserted in the opening by aligning it with the major dimension of the opening and then repositioned to align it with the minor dimension and engage the leg portions with said elements, and the support member and cleat member being sized and structured such that the engagement and securement to the first and second spaced-apart elements is accomplished without any further adjustment between the support member and cleat member, once they have been joined together, means for essentially permanently fastening the accessory to the support member, and mean for releasably connecting the support member to a third element affixed to the bicycle to prevent the cleat member and support member from rotating or translating relative tot eh first and second elements.

2. A device according to claim 1 wherein the elements defining the opening have opposite sides forming a plane and wherein the surfaces of the leg portions of the support member that engage the elements are also planar, whereby rotation of the cleat member and support member is facilitated.

3. A device according to claim 1 wherein each leg portion of the cleat member has a camming surface adapted to engage a respective element upon repositioning from alignment with the longer dimension to alignment with the shorter dimension and guide the leg portions of the cleat member and the support member into engagement with the elements upon such rotation.

4. A device according to claim 1 wherein the cleat member and support member are fastened together by fastening means including at least one screw passing through a hole in the support member and threaded into the cleat member and at least one locating pin on the cleat member extending into a hole in the support member to prevent rotation of the cleat member relative to the support member.

5. A device according to claim 1 wherein the support member is formed as a holder for the accessory.

6. A device according to claim 5 wherein the means for fastening the support member to the third element is a strap joined to the accessory.

7. A device according to claim 5 wherein the accessory is a carrier bag and the support member includes a plate-like portion engaging a portion of a wall of the bag and wherein said wall of the bag is engaged between the cleat member and the support member.

8. A device according to claim 5 wherein the means for fastening the support member to the third element is a clip joined to the accessory and having resilient legs portions engageable with opposite sides of the third element.

9. A device according to claim 5 wherein the accessory is a carrier bag and a wall of the bag is engaged between the cleat member and the support member.

10. A device according to claim 5 wherein the accessory is a carrier bag and wherein the support member engages the outside of a portion of a wall of the bag and further comprising a second support member received within the bag and essentially permanently attached to the support member.

11. A device according to claim 5 wherein the accessory is a carrier bag and the means for fastening the support member to the third element is a clip joined to the bag and having resilient legs portions engageable with opposite sides of the third element.

12. A device according to claim 11 wherein the clip includes a base portion engaging the exterior of a portion of a wall of the bag and wherein the clip is fastened to the bag by means including a backup member engaging the interior of said portion of the bag wall and at least one screw extending through a hole in the backup member and through the bag wall portion into the clip.

* * * * *